United States Patent
Hung

(10) Patent No.: US 8,173,202 B2
(45) Date of Patent: May 8, 2012

(54) MULTI-LAYER COATING STRUCTURE WITH ANTI-REFLECTION, ANTI-STATIC AND ANTI-SMUDGE FUNCTIONS AND METHOD FOR MANUFACTURING THE SAME

(75) Inventor: Hsue-Fu Hung, Hsinchu (TW)

(73) Assignee: Innovation & Infinity Global Corp., Hsinchu (TW)

( * ) Notice: Subject to any disclaimer, the term of this patent is extended or adjusted under 35 U.S.C. 154(b) by 660 days.

(21) Appl. No.: 12/318,670

(22) Filed: Jan. 6, 2009

(65) Prior Publication Data
US 2010/0173149 A1 Jul. 8, 2010

(51) Int. Cl.
*B05D 5/06* (2006.01)
(52) U.S. Cl. .............. 427/58; 427/64; 427/68; 427/162; 427/165; 427/167
(58) Field of Classification Search .................... 427/58, 427/64, 68, 162, 165, 167, 282, 284
See application file for complete search history.

(56) References Cited

U.S. PATENT DOCUMENTS

| | | | |
|---|---|---|---|
| 5,780,174 A * | 7/1998 | Tokito et al. | 428/690 |
| 6,191,833 B1 * | 2/2001 | Hirakata | 349/61 |
| 6,727,566 B1 * | 4/2004 | Fukui et al. | 257/437 |
| 2006/0244678 A1 * | 11/2006 | Cha | 345/37 |
| 2007/0154640 A1 * | 7/2007 | Lee | 427/282 |
| 2008/0095999 A1 * | 4/2008 | Yoshihara et al. | 428/220 |

FOREIGN PATENT DOCUMENTS
WO WO 2004-088370 * 10/2004
* cited by examiner

*Primary Examiner* — James Lin
(74) *Attorney, Agent, or Firm* — Rosenberg, Klein & Lee

(57) ABSTRACT

A multi-layer coating structure with anti-reflection, anti-static and anti-smudge functions includes a substrate and a coating module. The coating module is formed on a front surface of the substrate and composed of a plurality of indium tin oxide compound coating layers and a plurality of silicon dioxide compound coating layers that are alternately stacked upon each other. The coating module further includes a fluorocarbon compound coating layer that is the uppermost layer of the coating module. Because the surface layer has good electrical conductive properties, the surface layer reduces much of the work in the grounding process and also increases the total yield and reliability in high volume production. The present invention provides a surface conductive layer structure with an anti-reflection coating that can be applied to the LCD and PDP display industries for glass and plastic film substrates.

6 Claims, 2 Drawing Sheets

MULTI-LAYER COATING STRUCTURE WITH ANTI-REFLECTION, ANTI-STATIC AND ANTI-SMUDGE FUNCTIONS AND METHOD FOR MANUFACTURING THE SAME

BACKGROUND OF THE INVENTION

1. Field of the Invention

The present invention relates to a multi-layer coating structure and a method for manufacturing the same, and particularly relates to a multi-layer coating structure with anti-reflection, anti-static and anti-smudge functions and a method for manufacturing the same.

2. Description of Related Art

It is well known that the conventional layer structure for an anti-reflection optical coating has a general principle. This general principle is that the surface layer of the optical coating should be a material with low refractive index such as $SiO_2$, with a refractive index of 1.46, or $MgF_2$, with a refractive index of 1.38. However, when a metal based anti-reflection coating is applied on a display screen to create a high EMI shielding effect for a computer monitor, or low reflection glass for an LCD or a PDP, there are some bottlenecks in the process for high volume mass production. The basic reason for this is that the protective layer, for example $SiO_2$ or $MgF_2$, of the optical layer has a naturally porous microstructure and allows $H_2O$ vapor to diffuse into the thin, low resistivity metal layer, changing the electric and optical characteristics of the layer system. This optical layer structure has a high surface energy so that the optical layer structure absorbs dusts, pollutants or fingerprints easily.

SUMMARY OF THE INVENTION

One particular aspect of the present invention is to provide a multi-layer coating structure with anti-reflection, anti-static and anti-smudge functions. The process of manufacturing the multi-layer coating structure in high volume production is highly reliable and has been routinely used in industries such as semiconductor manufacturing, disc head manufacturing, LCD manufacturing, CRT manufacturing, architecture glass manufacturing, touch sensor display manufacturing, screen filter manufacturing and plastic web coating for more than twenty years.

The material of the surface layer of the present invention is a transparent conductive layer. The reflective index of the transparent surface conductive layer is below 0.5%. The resistivity of the anti-reflection coating is as low as $10^4$ to $10^5$ $\Omega$-cm, and its transparency is between 90% and 95%.

In order to achieve the above-mentioned aspects, the present invention provides a multi-layer coating structure with anti-reflection, anti-static and anti-smudge functions, including: a substrate and a coating module. The coating module is formed on a front surface of the substrate and composed of a plurality of indium tin oxide compound coating layers and a plurality of silicon dioxide compound coating layers that are alternately stacked upon each other. The coating module further includes a fluorocarbon compound coating layer that is the uppermost layer of the coating module.

In order to achieve the above-mentioned aspects, the present invention provides a method for manufacturing a multi-layer coating structure with anti-reflection, anti-static and anti-smudge functions, including: providing a substrate; and then formed a coating module on a front surface of the substrate. The coating module is composed of a plurality of indium tin oxide compound coating layers and a plurality of silicon dioxide compound coating layers that are alternately stacked upon each other. The coating module further includes a fluorocarbon compound coating layer that is the uppermost layer of the coating module.

Because the surface layer has good electrical conductive properties, the surface layer reduces much of the work in the grounding process and also increases the total yield and reliability in high volume production. The present invention provides a surface conductive layer structure with an anti-reflection coating that can be applied to the LCD and PDP display industries for glass and plastic film substrates.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED EMBODIMENTS

Figure 1:
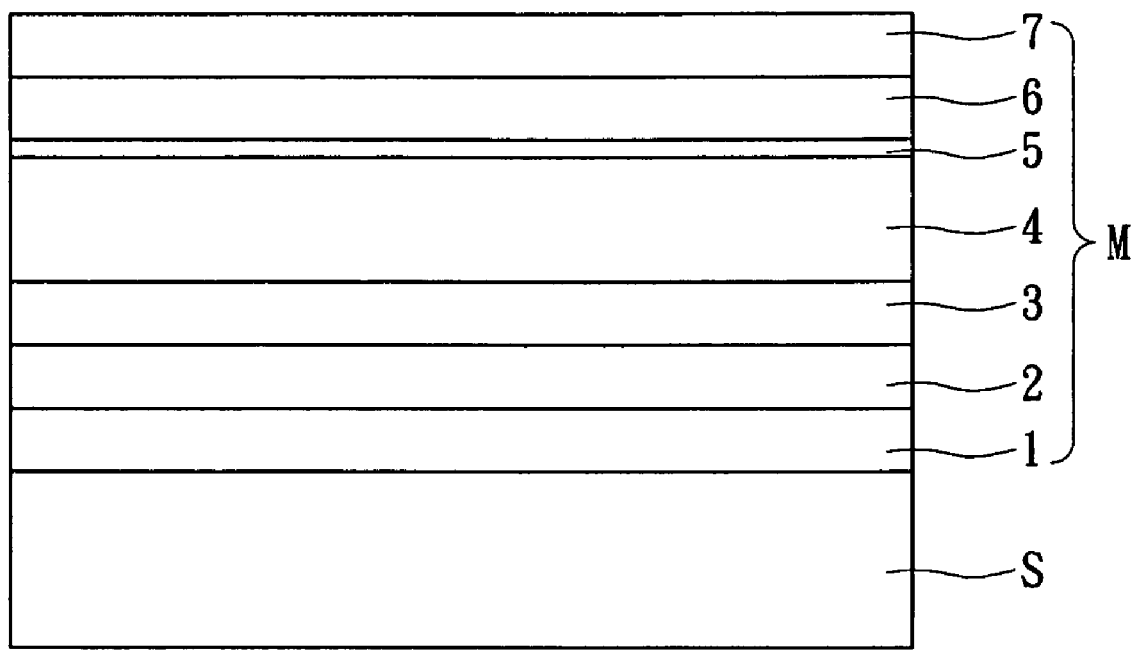
FIG. 1 is a front, schematic view of a multi-layer coating structure with anti-reflection, anti-static and anti-smudge functions according to the present invention.

Referring to FIG. 1, the present invention provides a multi-layer coating structure with anti-reflection, anti-static and anti-smudge functions. The coating structure includes a substrate S and a coating module M.

The substrate S can be a plastic film or a glass. The coating module M can be a basic coating for a plasma display or a liquid crystal display.

Moreover, the coating module M includes a first coating layer 1 formed on a front surface of the substrate S, a second coating layer 2 formed on the first coating layer 1, a third coating layer 3 formed on the second coating layer 2, a fourth coating layer 4 formed on the third coating layer 3, a fifth coating layer 5 formed on the fourth coating layer 4, a sixth coating layer 6 formed on the fifth coating layer 5, and a seventh coating layer 7 formed on the sixth coating layer 6.

Furthermore the first coating layer 1, the third coating layer 3 and the fifth coating layer 5 are indium tin oxide compound coating layers. The second coating layer 2, the fourth coating layer 4 and the sixth coating layer 6 are silicon dioxide compound coating layers. In addition, each indium tin oxide compound coating layer is composed of 90% $In_2O_3$ and 10% $SnO_2$ ($In_2O_3$ 90% $SnO_2$ 10%), and each silicon dioxide compound coating layer is $SiO_2$.

Therefore, the coating module M is formed on the front surface of the substrate S and is composed of a plurality of indium tin oxide compound coating layers and a plurality of silicon dioxide compound coating layers that are alternately stacked upon each other. The coating module M further includes a fluorocarbon compound coating layer that is the uppermost layer of the coating module M.

Moreover, the refractive indices of the first coating layer 1, the third coating layer 3 and the fifth coating layer 5 are 1.9~2.0, and the refractive indices of the second coating layer 2, the fourth coating layer 4 and the sixth coating layer 6 are 1.4~1.5. Furthermore, the thickness of the first coating layer 1 is 10~20 nm, the thickness of the second coating layer 2 is 30~50 nm, the thickness of the third coating layer 3 is 30~50 nm, the thickness of the fourth coating layer 4 is 80~100 nm, the thickness of the fifth coating layer 5 is 5~10 nm, the thickness of the sixth coating layer 6 is 5~10 nm, and the thickness of the seventh coating layer 7 is 5~10 nm.

In addition, the first coating layer 1, the third coating layer 3 and the fifth coating layer 5 (the indium tin oxide compound coating layers) are formed by a DC or AC magnetron sputtering method. The second coating layer 2, the fourth coating layer 4 and the sixth coating layer 6 (the silicon dioxide compound coating layers) are formed by a DC or AC magnetron sputtering method. Moreover, all of the coating layers (from the first coating layer 1 to the sixth coating layer 6) are formed by an in-line or roll-to-roll vacuum sputtering method.

Figure 2:
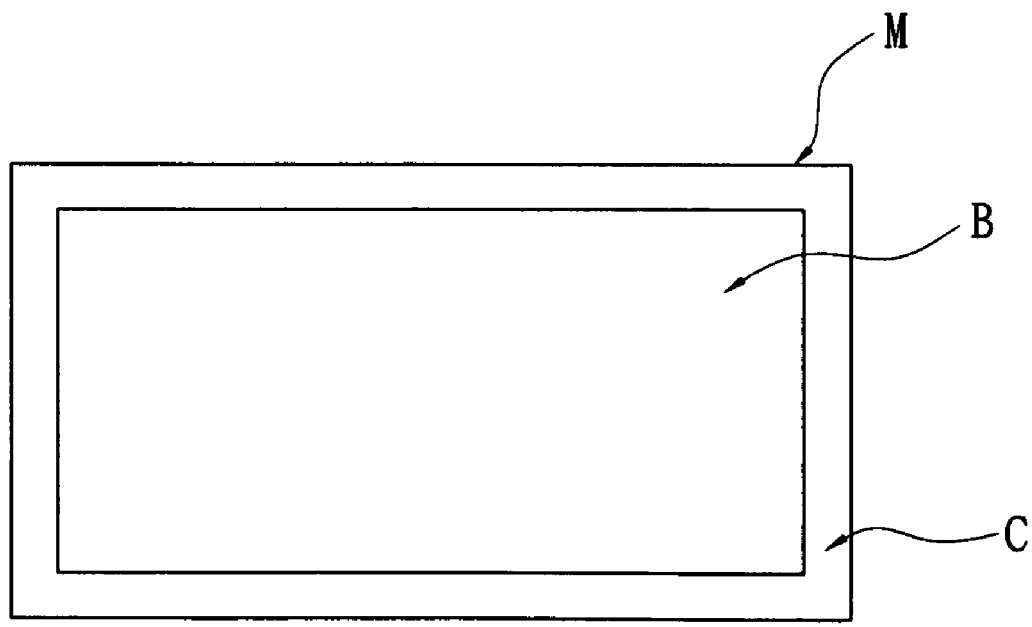
FIG. 2 is a top, schematic view of a multi-layer coating structure with anti-reflection, anti-static and anti-smudge functions according to the present invention.

Referring to FIG. 2, the multi-layer coating structure of the present invention further includes a conductive layer C formed on a peripheral area of a top surface of the coating module M in order to connect to a ground. Therefore, the conductive layer C is formed on a peripheral area of a top surface of the seventh coating layer 7 of the coating module M for connecting to the ground. In other words, after the coating module M is formed on the substrate S, a shutter B is placed on the top surface of the coating module M. The shutter B has a size smaller than that of the coating module M in order to expose a peripheral area of the top surface of the coating module M. Afterward a conductive layer C is coated on the peripheral area of the top surface of the coating module M in order to connect to the ground and achieve good electrical contact. Finally, the shutter B is removed. In addition, the conductive layer C can be a silver paste.

Figure 3:
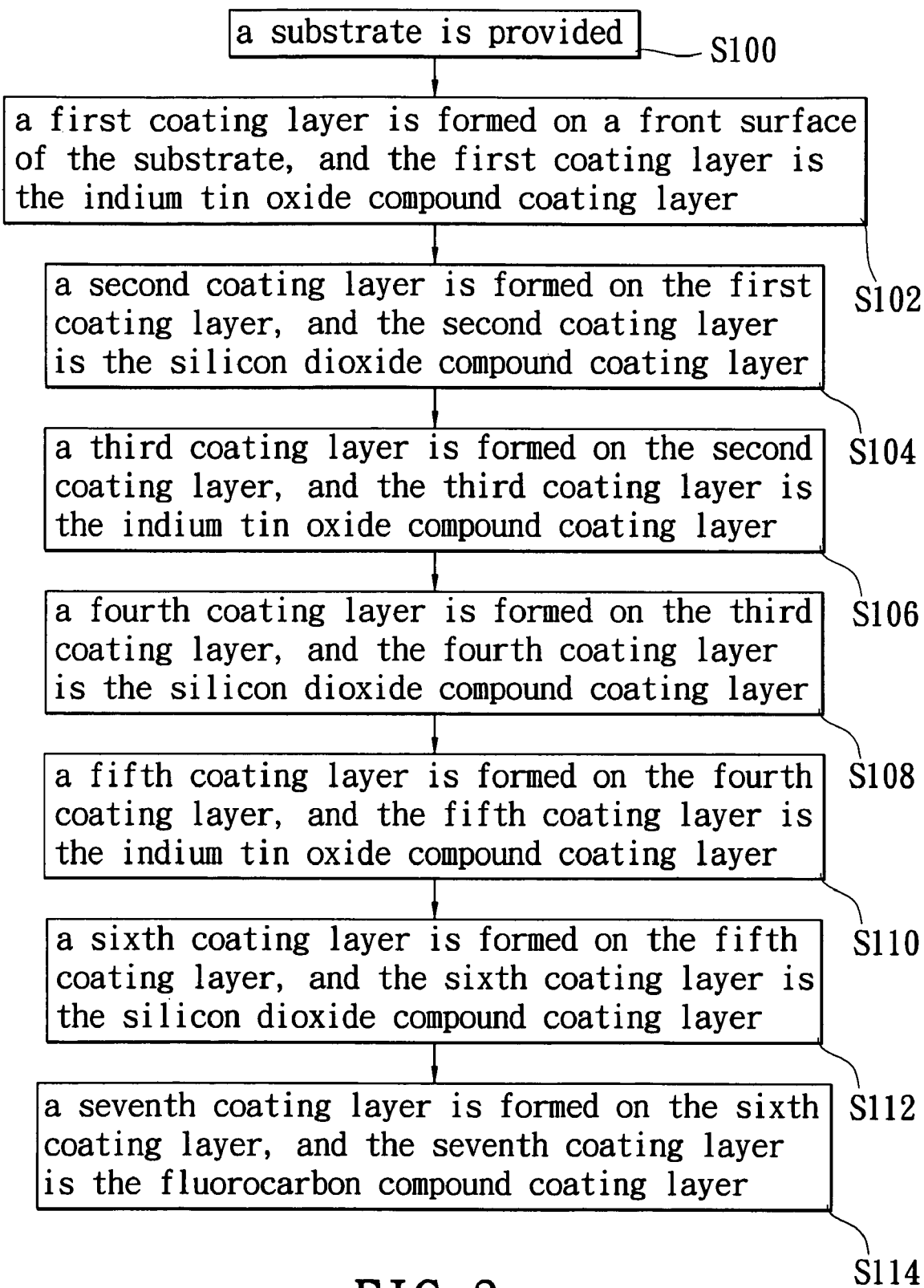
FIG. 3 is a flow chart of a method for manufacturing a multi-layer coating structure with anti-reflection, anti-static and anti-smudge functions according to the present invention.

Referring to FIG. 3, the present invention provides a method for manufacturing a multi-layer coating structure with anti-reflection, anti-static and anti-smudge functions. The method includes:

S100: a substrate S is provided;

S102: a first coating layer 1 is formed on a front surface of the substrate S, and the first coating layer 1 is the indium tin oxide compound coating layer;

S104: a second coating layer 2 is formed on the first coating layer 1, and the second coating layer 2 is the silicon dioxide compound coating layer;

S106: a third coating layer 3 is formed on the second coating layer 2, and the third coating layer 3 is the indium tin oxide compound coating layer;

S108: a fourth coating layer 4 is formed on the third coating layer 3, and the fourth coating layer 4 is the silicon dioxide compound coating layer;

S110: a fifth coating layer 5 is formed on the fourth coating layer 4, and the fifth coating layer 5 is the indium tin oxide compound coating layer;

S112: a sixth coating layer 6 is formed on the fifth coating layer 5, and the sixth coating layer 6 is the silicon dioxide compound coating layer; and S114: a seventh coating layer 7 is formed on the sixth coating layer 6, and the seventh coating layer 7 is the fluorocarbon compound coating layer.

In one embodiment the present invention of the anti-reflection coating structure has 7 layers and includes a first coating layer, a second coating layer, a third coating layer, a fourth coating layer, a fifth coating layer, a sixth coating layer and a seventh coating layer formed on a substrate in sequence. Each layer is described in terms of physical or optical thickness. The optical thickness is the mathematical product of a layer's thickness and its refractive index. It is described as a fraction of a designed wavelength. In the present invention the designed wavelength is about 520 nm.

The first coating layer or the surface layer is an indium tin oxide compound coating layer with a refractive index between 1.9 and 2.0 and a physical thickness of 30~50 nm.

The second coating layer is a silicon dioxide compound coating layer with a refractive index between 1.4 and 1.5 and a physical thickness of 10 to 18 nm.

The third coating layer is an indium tin oxide compound coating layer with a refractive index between 1.9 and 2.0 and a physical thickness of 30~50 nm.

The fourth coating layer is a silicon dioxide compound coating layer with a refractive index between 1.4 and 1.5 and a physical thickness of 80 to 100 nm.

The fifth coating layer is an indium tin oxide compound coating layer with a refractive index between 1.9 and 2.0 and a physical thickness of 5~10 nm.

The sixth coating layer is a silicon dioxide compound coating layer with a refractive index between 1.4 and 1.5 and a physical thickness of 5 to 10 nm.

The sixth coating layer is a fluorocarbon compound coating layer with a refractive index between 1.4 and 1.5 and a physical thickness of 5 to 10 nm.

In conclusion, the process of manufacturing the multi-layer coating structure in high volume production is highly reliable and has been routinely used in industries such as semiconductor manufacturing, disc head manufacturing, LCD manufacturing, CRT manufacturing, architecture glass manufacturing, touch sensor display manufacturing, screen filter manufacturing and plastic web coating for more than twenty years. The material of the surface layer of the present invention is a transparent conductive layer. The reflective index of the transparent surface conductive layer is below 0.5%. The resistivity of the anti-reflection coating is as low as $10^4$ to $10^5$ Ω-cm, and its transparency is between 90% and 95%.

Because the surface layer has good electrical conductive properties, the surface layer reduces much of the work in the grounding process and also increases the total yield and reliability in high volume production. The present invention provides a surface conductive layer structure with an anti-reflection coating that can be applied to the LCD and PDP display industries for glass and plastic film substrates.

Although the present invention has been described with reference to the preferred best molds thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for manufacturing a multi-layer coating structure with anti-reflection, anti-static and anti-smudge functions, comprising:

providing a substrate; and forming a coating module on a front surface of the substrate, wherein the coating module is composed of a plurality of indium tin oxide compound coating layers and a plurality of silicon dioxide compound coating layers that are alternately stacked upon each other, wherein the coating module further comprises a fluorocarbon compound coating layer that is the uppermost layer of the coating module.
wherein the coating module is formed by the steps of:
forming a first coating layer on the front surface of the substrate, wherein the first coating layer is the indium tin oxide compound coating layer having a thickness of 10~20 nm;
forming a second coating layer on the first coating layer, wherein the second coating layer is the silicon dioxide compound coating layer having a thickness of 30~50 nm;
forming a third coating layer on the second coating layer, wherein the third coating layer is the indium tin oxide compound coating layer having a thickness of 30~50 nm;
forming a fourth coating layer on the third coating layer, wherein the fourth coating layer is the silicon dioxide compound coating layer and having a thickness of 80~100 nm;
forming a fifth coating layer on the fourth coating layer, wherein the fifth coating layer is the indium tin oxide compound coating layer having a thickness of 5~10 nm;
forming a sixth coating layer on the fifth coating layer, wherein the sixth coating layer is the silicon dioxide compound coating layer having a thickness of 5~10 nm;
forming a seventh coating layer on the sixth coating layer, wherein the seventh coating layer is the fluorocarbon compound coating layer having a thickness of 5~10 nm.

2. The method as claimed in claim 1, wherein the substrate is a plastic film.

3. The method as claimed in claim 1, wherein the substrate is a glass.

4. The method as claimed in claim 1, wherein the coating module is a basic coating for a plasma display or a liquid crystal display.

5. The method as claimed in claim 1, wherein the refractive indices of the first coating layer, the third coating layer and the fifth coating layer are 1.9~2.0, and the refractive indices of the second coating layer, the fourth coating layer and the sixth coating layer are 1.4~1.5.

6. The method as claimed in claim 1, further comprising:
placing a shutter on a top surface of the coating module, wherein the shutter has a size smaller than that of the coating module for exposing a peripheral area of the top surface of the coating module; and
coating a conductive layer on the peripheral area of the top surface of the coating module in order to connect to a ground.

* * * * *